United States Patent [19]

Bubeck et al.

[11] Patent Number: 4,716,772
[45] Date of Patent: Jan. 5, 1988

[54] CHILD-RESISTANT CAP TORQUE EVALUATOR

[76] Inventors: Kenneth B. Bubeck, 23 Dorchester Ave., Selkirk, N.Y. 12158; Lawrence E. Ruff, P.O. Box 966, Coeymans, N.Y. 12045

[21] Appl. No.: 851,546

[22] Filed: Apr. 14, 1986

[51] Int. Cl.⁴ .......................... G01L 5/00; G01L 5/16
[52] U.S. Cl. .................................. 73/862.23; 73/847; 73/862.04
[58] Field of Search .............. 73/52, 847, 794, 862.04, 73/862.21, 862.23

[56] References Cited

U.S. PATENT DOCUMENTS

| | | | |
|---|---|---|---|
| 2,279,698 | 4/1942 | Weckerly | 73/847 |
| 2,552,407 | 5/1951 | Crabbe | 73/862.21 |
| 3,866,463 | 2/1975 | Smith et al. | |
| 4,539,852 | 9/1985 | Feld | |
| 4,674,340 | 6/1987 | Burt et al. | 73/862.23 |

FOREIGN PATENT DOCUMENTS 0129717 10/1980 Japan ................. 73/862.21

Primary Examiner—Charles A. Ruehl
Attorney, Agent, or Firm—Schmeiser, Morelle & Watts

[57] ABSTRACT

A method and apparatus for loading and testing a container which is sealed with a child-resistant cap. A container cap is subjected to vertical loading and torque forces in order to determine if it can be opened by forces falling within design parameters. Both methods and apparatus are cooperatively employed to assure precise alignment of the container-under-test as well as recording resultant test data.

8 Claims, 5 Drawing Figures

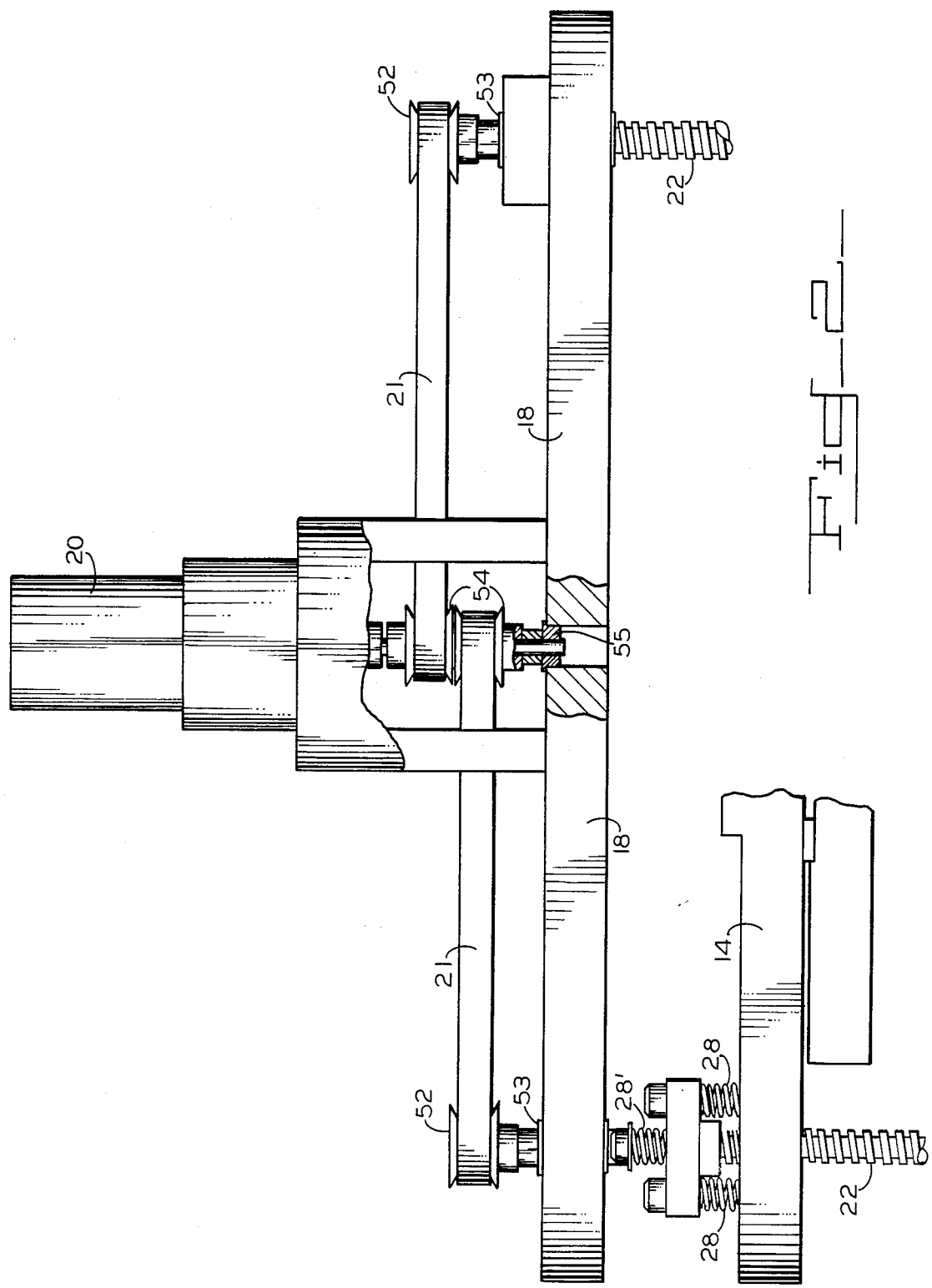

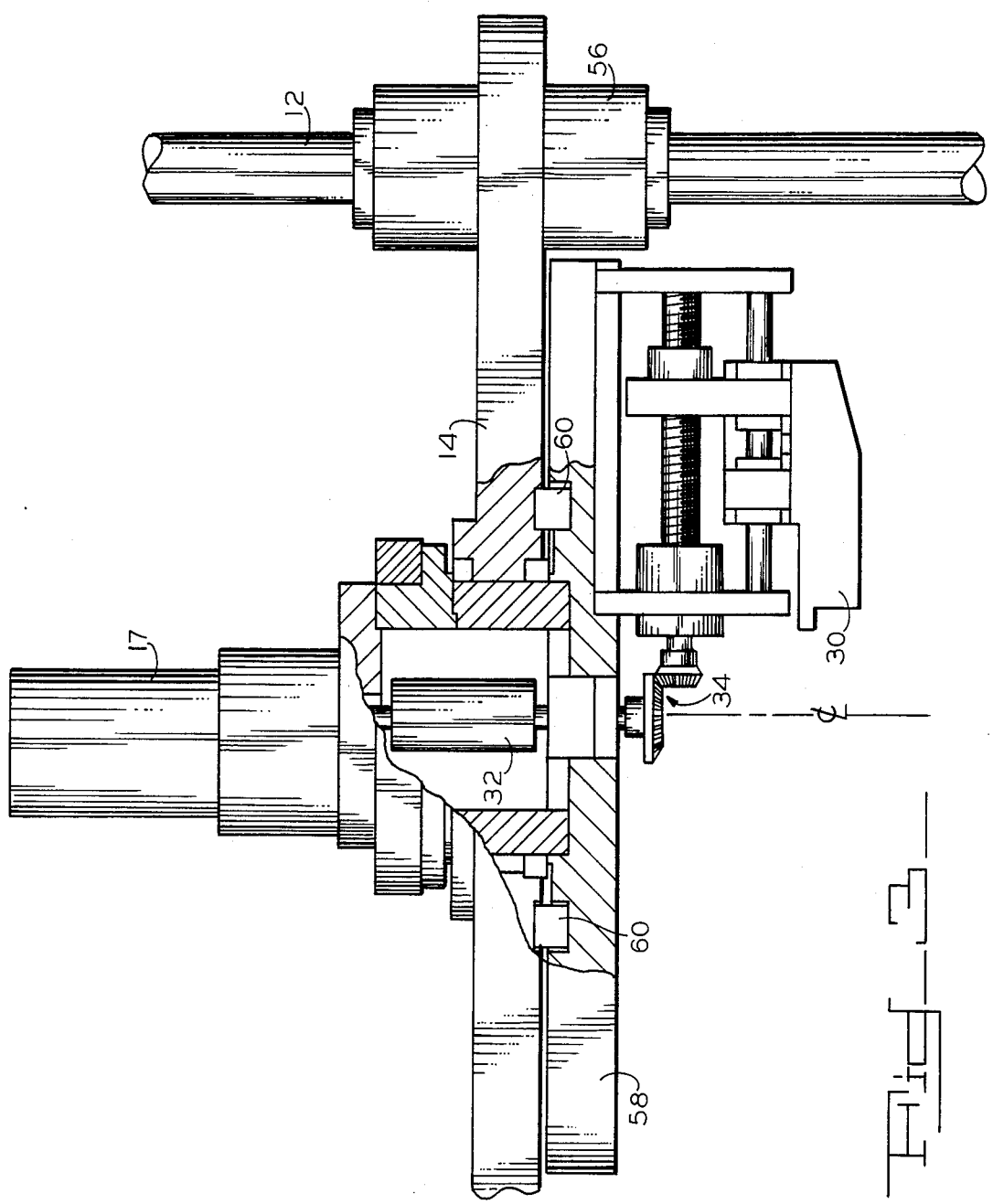

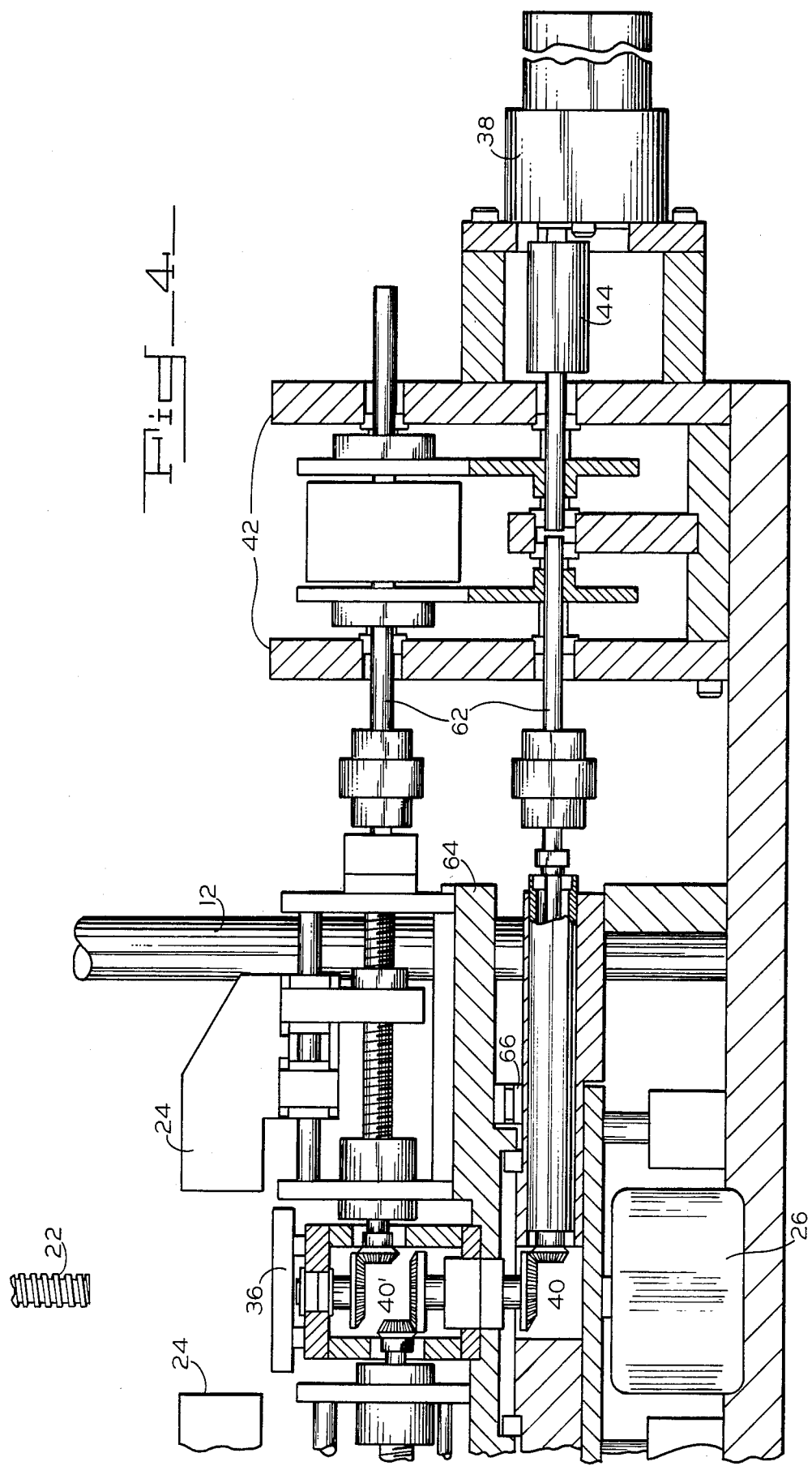

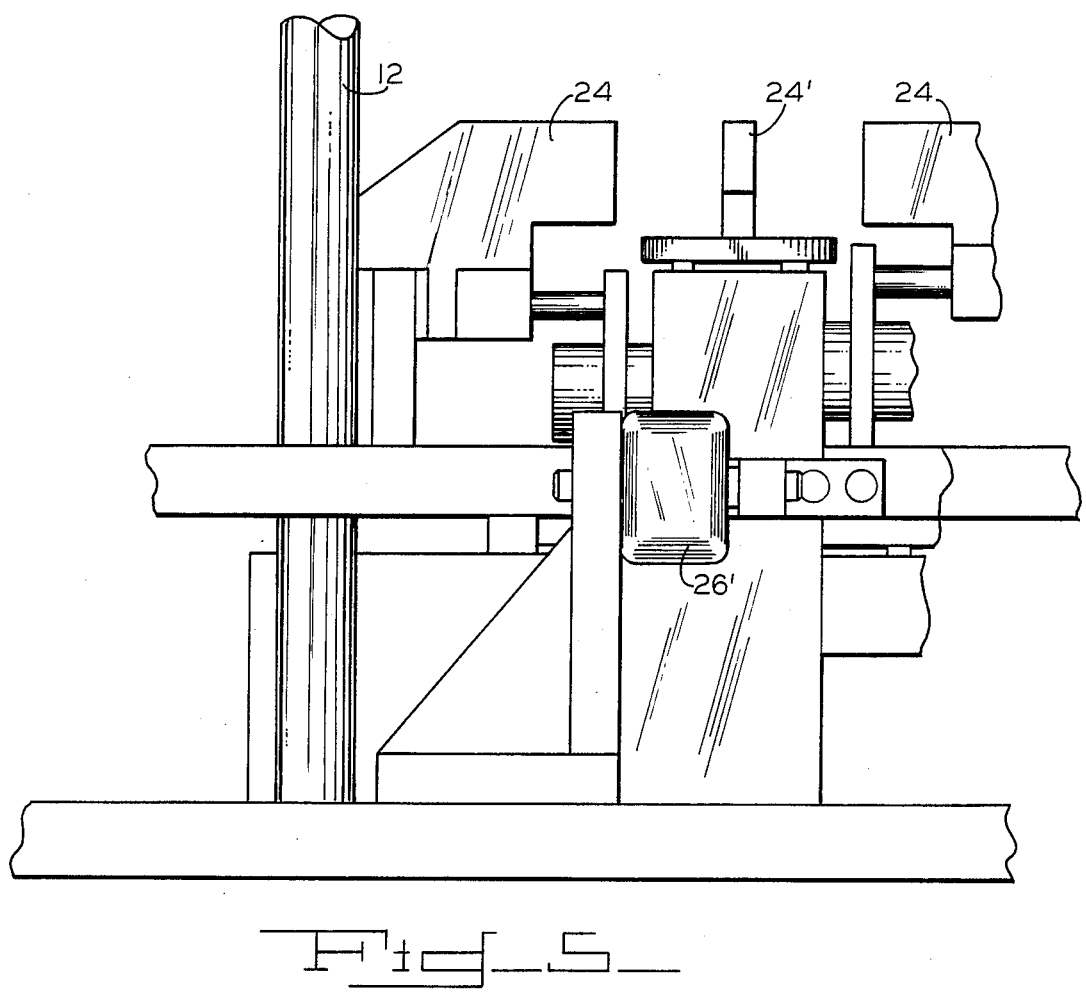
Fig_5

CHILD-RESISTANT CAP TORQUE EVALUATOR

FIELD OF THE INVENTION

This invention relates generally to machines which measure torque and loading forces and, particularly, to a method and apparatus for evaluating coaxial loading and torque forces required to actuate child-resistant bottle caps.

BACKGROUND AND OBJECTS OF THE INVENTION

For some years now there has appeared on the market various forms of child-resistant caps for a variety of items ranging from medicinals to household powders and liquids. When these container cappings first appeared, user comments suggested that some caps were adult- as well as child-proof. Such a suggestion was empirical evidence that no two caps were likely to be removed from their respective containers by application of the same forces. Current quality control methods, depending heavily upon sampling of production line packaged items, were then, as now, greatly hampered by the lack of efficient, sensitive and accurate testing and recording mechanisms.

Although it is well known to use a conventional torque tester to test the torque required to remove a screw-type bottle cap, such conventional testing methods become antiquated in view of a requirement to apply compound forces on the varying sized containers now bearing child-resistant caps. Common among modern child-resistant cap varieties are those which: require a peripheral pressure on the sides of the cap itself; require a downward loading in combination with a twisting of the cap; and, require a combination of peripheral pressure on the cap in conjunction with a downward loading and a twisting force.

There are also modern caps which merely require a twist, to break the seal. Exemplary of the modern testing devices which are available to test the torque required to break such a seal is the mechanism disclosed in a patent issued to Feld, U.S. Pat. No. 4,539,852, relating to a VIAL CAP TORQUE TESTER. This apparatus contemplates fixing a container basewise into a constraining, base mechanism which is coupled to a torque sensing and registering meter and applying a vise-gripping mechanism to the cap. Such an apparatus allows a test operator to apply torque to the vice-gripper assembly while observing the gauge mechanism at the point when the cap breaks free of the seal.

Another similar mechanism is disclosed in a patent issued to Smith et al, U.S. Pat. No. 3,866,463 for a DEVICE FOR TESTING THE TORQUE REQUIRED TO RELEASE A SCREWCAP FROM ITS TIGHTENED POSITION. This apparatus comprises a rotary bottle support adapted to hold and rotate a bottle, the cap of which is held against rotation. A gear and rack arrangement is actuated by a ram to rotate the bottle support in order to loosen the bottle cap. An intricate pneumatic apparatus is then employed to apply incremental, rotational forces on the bottle until breakaway, while a steady downward pressure is exerted on the top of the cap. After the breakaway torque indication is inferred from the registered pneumatic pressures used to rotate the bottle, the tester sequences back to its starting index.

Both of the above inventions are indicative of the present state-of-the-art and, yet, lack features necessary for a modern quality control mechanism such as the instant CHILD-RESISTANT CAP TORQUE EVALUATOR. Of paramount concern is the need to conduct a non-destructive test. Further, in the case of medicinals or sealed products that cannot tolerate human intervention in the production process, a demand arises for an automatic evaluating system.

Concerns which present themselves in an automatic testing scheme are those related not only to the variety of cap-affixing mechanisms, but also to parameters such as container size, shape and material of construction. Such parameters imply the need for a tester or evaluator capable of adjusting itself to variable size containers, having clamping or securing mechanisms capable of adjusting to different geometric configurations and, although capable of securing container and cap for testing purposes, is discretional in the clamping forces applied.

It is, therefore, an object of this invention to provide a torque evaulator mechanism which is capable of orienting the subject under test in a position conducive to precise coaxial and torquing force applications.

It is another object of this invention to provide a gripping or securing means which will function to secure the item under test, irrespective of its geometry.

Another object of this invention is to secure the item under test without violating its physical integrity.

Yet another object of this invention is to provide a mechanism susceptible of control by automatic means, thereby obviating the need for human intervention in the testing regimen.

It is also an object of this invention to inculcate in the aforementioned automatic control means a method for applying coaxial and rotational or toruqing forces to containers sealed with a variety of modern day childresistant caps.

The objects and advantages of the invention are set forth herein and will be obvious, or may be learned by practicing the invention, they being realized by the subsequent description, explanation of the drawings, and point out in the appended claims.

SUMMARY OF THE INVENTION

The objects of this invention may be realized by first clamping the container and cap to be tested in a three-jaw chuck at the bottle cap or at the container cap, thus assuring that the container is perfectly centered before final securing. The container is transported to and finally secured in a four-jaw chuck which is coupled to a plurality of load cells that will accurately determine all applied and reaction loads placed on the container. All loads are applied to the child-resistant cap through the three-jaw chuck mechanism. The three-jaw chuck is mounted in a vertically moveable platform and coupled to a cap clamping motor and a cap torque sensing motor. The three-jaw chuck plaform traverses a framework which is affixed to the base in which the four-jaw chuck and load cells are situated. A vertical traversing motor moves the platform vertically while applying a vertical load to the container or item under test. Concurrently, the cap torque sensing motor applies rotary forces to the child-resistant cap through rotation of the three-jaw chuck.

In operation, a container is first captured in the three-jaw chuck about its cap and thus aligned for testing. The three-jaw chuck's vertically moveable platform is then moved into position so that the container may be captured within the four-jaw chuck. A control means then sequences the vertical traverse and the cap torque sensing motors through a method of alternate force applications which results in the optional tightening and loosening of the child-resistant cap. The specific forces required to actually cause cap breakaway, are sensed in the load cells and registered by the control means. Immediately after testing, the container is resealed by the same mechanism, the four-jaw chuck releases the container, the platform traverses vertically upwards and, concurrent with automatic removal means, the three-jaw chuck releases the cap.

It should be understood that the foregoing general description and the following detailed description as well, serve only to explain the invention and are not considered to be restrictive thereof. Further, the accompanying drawings referred to herein and constituting a part hereof, illustrate a single preferred embodiment of the invention and are not intended as a limitation. Those familiar with the art will immediately recognize the advantage of the three-jaw chuck for centering the container preparatory to placing a force coaxial with its longitudinal axis. They are also aware that other mechanisms, the entire apparatus of which may be rotated, are also capable of centering a container or cap in the testing mechanism.

BRIEF DESCRIPTION OF THE DRAWINGS

Of the drawings:

FIG. 2 is a partial view of vertical platform suspension and drive assembly;

FIG. 3 is a partial view of the vertical traversing platform with a partial sectional view of the three-jaw chuck;

FIG. 4 is a sectional view of the base subassembly depicting only one jaw of the four-jaw chuck; and FIG. 5 is a partial rear view of FIG. 4 view displaying the torque load cell.

DESCRIPTION OF THE PREFERRED EMBODIMENT

Figure 1:
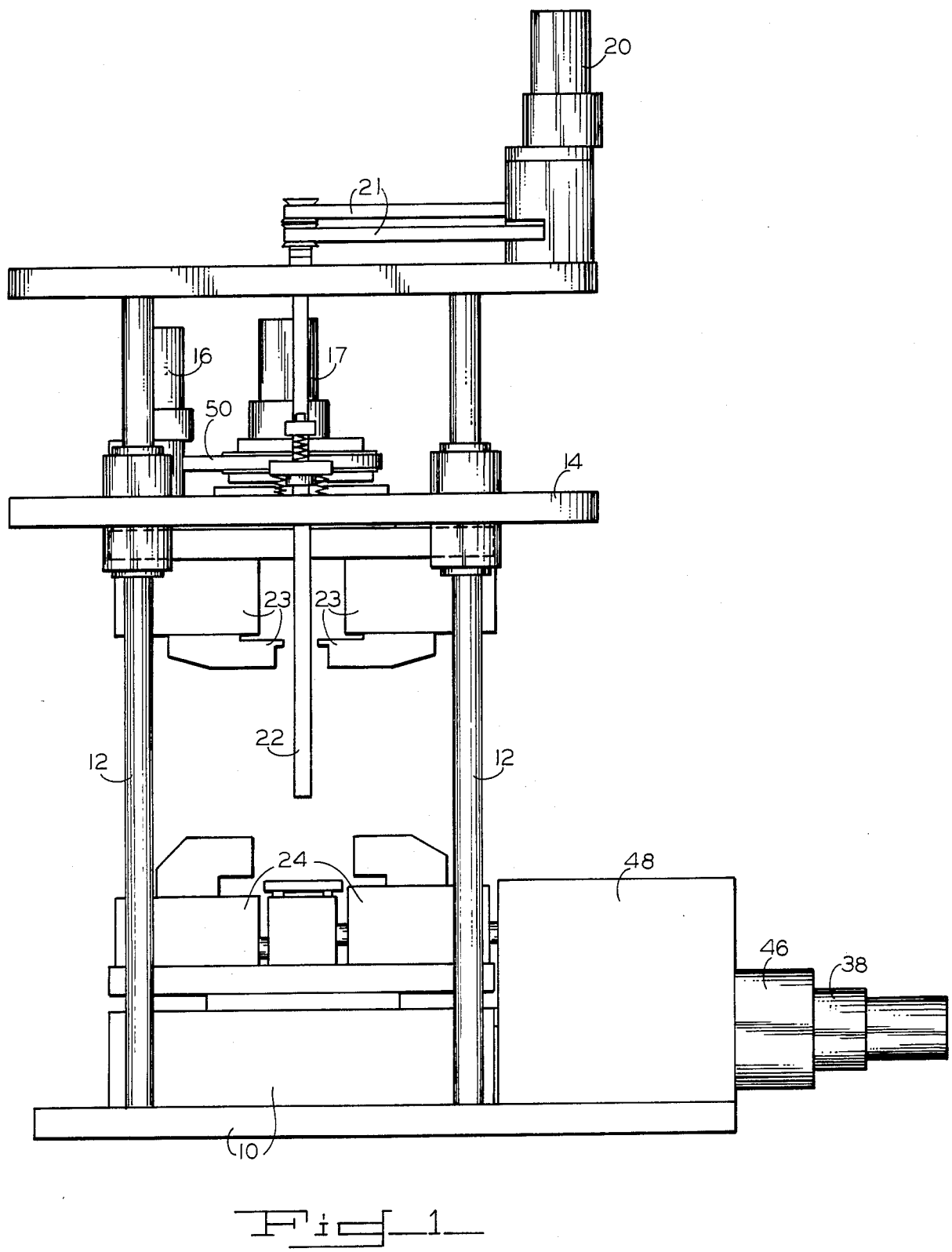
FIG. 1 is a partial, functional elevation of the invention.

A personal computer (such as the IBM/PC, not depicted herein) is employed as both a control and data registration means for the torque evaluator disclosed in the present specification. It is the menu-driven PC, in conjunction with the inventors' specially developed robotic package (for interruption of assembly line production and pretest set-up not herein disclosed) which allows a human operator to oversee the testing process but refrain from injecting a human presence into the testing regimen and requiring, in the case of medicinals or similar substances, removal of the tested container and contents from production.

The given range of containers will resisde independently within the computer's memory (IBM/PC). The operation will be menu driven and the operator will be queried as to which part is to be tested. The operator will then command loading of the bottle and cap into position that it might be seized and centered by the three-jaw chuck of FIG. 2.

As an alternative to the three-jaw chuck, the inventors suggest an apparatus comprised of three curved elements, having interior knurled or toothed surfaces and mounted on a rotatable circular disk. By pivoting each arm at only one end, that end having extension-actuation means coupled to the extension-actuation means of the other arms, the arms may move inward, gripping the top or cap of the container, thus effecting a rotational force vector for applying torque to the cap. This mechanism would operate similarly to a strap wrench or wrenches currently on the market and used for loosening jar covers. The menu will inquire of the operator the desired mode of operation comprising any, or a combination of: application torque; downward load and removal torque with both incrementally increasing during continuous operation; and removal torque for plain containers with no downward load. When testing solely in the latter mode, a servomotor will be in the stall condition with a control signal to the motor increasing until the static friction of the bottle cap is overcome.

For all modes of operation, the data will be continuously monitored and the pertinent data will be displayed on the monitor following the appropriate menu driven response.

Referring now more particularly to FIG. 1-3 of the accompanying drawings, there is illustrated a singular preferred embodiment of the force application apparatus. Specifically, FIG. 1 depicts the entire apparatus comprising: a base member 10, a vertical support structure 12 connected to the base member, a moveable platform 14 on which is mounted a cap torque motor 16 and a cap chuck motor 17, and, completing the superstructure, a top stationary platform 18 on which is mounted a vertical traverse motor 20 which is coupled to interlinking drive-belts 21 so that it might cause, through screw means 22, the moveable platform 14 to traverse vertically. The cap torque sensing motor 16 is coupled to the three-jaw chuck assembly 23 as depicted in FIG. 3. Located on the base 10, coaxial with respect to the planar center of the three-jaw chuck is the four-jaw chuck 24 with load cell elements 26, 26' (not shown in FIG. 1). Load cell arrangement and four-jaw chuck coupling are further delineated in the explanation of FIGS. 4 and 5.

During development, it was determined that motors produced the best test results when operated in the velocity mode. The graphical data were smoother and technically explainable.

FIGS. 2, 3 and 4 are now described in conjunction with the method in which the apparatus is employed in order to determine the downward load or coaxial force, as well as the torque required to release a child-resistant cap from its container. Referring first to FIGS. 2 and 3, and because it is a feature of the child-resistant cap to exhibit some freedom of rotation as well as up and down translation, the moveable platform 14 has been mounted using springs 28, 28' which allow the moveable upper stage to move upward, slightly, during the incipient testing regimen. The cap, affixed to its container, is seized by the jaws of the three-jaw chuck 30 (only one jaw depicted herein). This is done when, on command from the menu-driven controller (not depicted herein), the cap clamp motor 17 drives the jaws together through an interlinking clutch 32 and bevel-gear drive mechanism 34. The precision closure of all three jaws assures that the cap is centered on the vertical force center line (depicted as $\mathcal{L}$). The clutch 32 is a torque sense-slip mechanism and, when sufficient pressure has been exerted by the jaws on the cap, the clutch slips and signals the controller that the cap is secured.

Referring now to FIG. 4 in conjunction with FIG. 3, the upper stage is now driven down supports 12 until the container rests on platform 36 within the four-jaw chuck assembly 24. When this activity is sensed, the controller commands closure of the four-jaw chuck assembly by actuating the drive motor 38. Drive is exerted through bevel-gear assembly 40, 40' and differential gear assembly 42, alternately to first one pair of jaws 24 until, a predesignated force slip clutch 44 senses it and slips, allowing differential assembly 42 to transmit the continuing motor force through to the second pair of jaws (not depicted herein). When the clutch assembly 44 slips for the second pair of jaws, a signal is sent to the control means and capturing of the container is completed.

The control means now initiates the test method. The cap torque motor 16 and the vertical traverse motor 20 are engaged. In the first operation, a pre-set (in controller) downward force is applied and, simultaneously, the cap is rotated counterclockwise for a specific period at a predetermined torque. Because of the up-down, free-motion feature of the child resistant cap, a resilient downward force is required and the upper stage is allowed to move slightly upward because of springs 28, 28'. When one-half turn or more is sensed, the controller commands a slight retightening, rotating the cap clockwise at an extremely low torque level and via the endcoder (not depicted) monitoring the position of the cap torque motor 16. This second operation is alternated with the first and is continued while gradually and incrementally increasing the downward load until a large encoder count is observed for the cap torque motor 16, signifying a clockwise critical rotation of more than one third.

When upon retightening the cap rotates more than onethird, it is concluded that the cap was removed by the previous (first) operation and at the last indicated force and torque levels. Should the cap when retightened not rotate at least one-third turn, the first operation is repeated with incremental force increases.

The data are presented as the minimum downward load and associated removal torque and are recorded by the control means. In this embodiment, load cells 26, 26' are used as a primary sensing means for detecting downward loading force (coaxial load) and torque. Load cell 26 of FIG. 4 senses downward force while cell 26' of FIG. 5 senses torque.

Additional parts of the aforementioned preferred embodiments will be readily recognized by those familiar with the art and comprise:

in FIG. 1, slip clutch housing 46, differential housing 48 and cap torque drive belt 50;

in FIG. 2, moveable platform drive pulleys 52 and drive shaft bushing 53, as well as vertical traverse motor pulleys 54 and motor drive shaft bearings 55;

in FIG. 3, moveable platform guide bushings 56, 3-jaw chuck base 58 and base bearing ring 60;

in FIG. 4, clamp drive shafts 62, 4-jaw chuck platform 64 and its bearing 66; and in FIG. 5, a single jaw 24' of the second jaw pair.

The invention in its broader aspects is not limited to this singular embodiment, but departures may be made therefrom within the scope of the accompanying claims, without departing from the principles of the invention nor sacrificing its advantages.

We claim:

1. A method for loading and conducting testing on a container which is sealed with a child resistant cover, so as to subject said container to cover-opening testing, comprising the following steps:

securing said container about its cover by a first clamping means thereby orienting and posturing said container for subjecting it to cover-opening tests;

securing said container by a second clamping means the radial force center of which is coaxial with said first clamping means;

translating said first and second clamping means towards each other along their common axis while rotating said clamping means relative to each other about said common axis; and recording the forces and combinations thereof resulting from said translating while rotating step, whereby said first and second securing steps comprise the laoding of said container, and said translating while rotating and said recording steps comprise its testing.

2. A method for determining the forces required for actuating child-resistant caps with respect to the containers upon which they are mounted, comprising:

applying a specified resilient force to a cap which is secured to a container, urging it towards said container while continuously recording said resilient force being applied;

rotating said cap a pre-set amount in a direction to open it and continuously monitoring the rotating force while applying said resilient force;

reverse-rotating said cap at a low torquing level while monitoring for critical rotation of cap; and repeatedly applying, rotating, and reverse-rotating steps incrementally until, immediately following said reverse-rotating step, monitoring of the reverse-rotating force indicates critical rotation of at least one third, whereby it shall be determinable from said monitoring and recording that said resilient and rotating forces immediately preceding said critical rotation are representative of the totality of forces required for actuating said child-resistant cap.

3. An apparatus for positioning a container and determining the forces required to remove from said container a child-resistant cap comprising:

a first securing means, adjustable and disposable opposite a second securing means;

a second securing means, adjustable and mounted to a base means;

engaging means for translating said first securing means toward said second securing means and for rotating one with respect to the other;

sensing means for determining forces applied through translation and rotation of said first and second securing means; and control means to sequence said securing and engaging means through a predetermined operation.

4. The invention of claim 3 wherein said second securing means comprises a four-jaw chuck, the opposing jaw-pairs of which are independently adjustable and which further comprises drive means for operating first one jaw-pair until closure, and then the other.

5. The invention of claim 4 wherein said drive means comprises, in combination, a differential means, clutch means and a drive motor, whereby said drive motor provides clamping force coupled by said clutch means through said differential means.

6. The invention of claim 3 wherein said first securing means comprises a three-jaw chuck which, when clamped first to a capped container, serves to orient said container coaxially with respect to said second securing means and further comprises a slip-clutch and cap clamp motor wherein said motor drives the jaws until closure and the slip-clutch prevents excessive force application by slipping and signaling the control means of closure.

7. The invention of claim 3 wherein said engaging means comprises;
 translating means for moving said first and second securing means towards and away from each other along their common axis; and
 rotational drive means for said first securing means whereby said first securing means may be rotated about said common axis.

8. The invention of claim 3 wherein said sensing means comprises a plurality of load cells at least one of which senses the translating force being exerted through said base means and at least one other located adjacent said base means and coupled thereto, whereby torque exerted upon said second securing means and through said bases is sensed.

* * * * *